US010687344B2

(12) United States Patent
Kela et al.

(10) Patent No.: US 10,687,344 B2
(45) Date of Patent: Jun. 16, 2020

(54) NETWORK NODE AND METHOD THEREOF

(71) Applicant: Huawei Technologies Co., Ltd., Shenzhen, Guangdong (CN)

(72) Inventors: Petteri Kela, Helsinki (FI); Henrik Lundqvist, Kista (SE); Johan Christer Qvarfordt, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 104 days.

(21) Appl. No.: 15/715,007

(22) Filed: Sep. 25, 2017

(65) Prior Publication Data

US 2018/0014318 A1    Jan. 11, 2018

Related U.S. Application Data

(63) Continuation of application No. PCT/EP2015/056527, filed on Mar. 26, 2015.

(51) Int. Cl.
*H04W 72/12* (2009.01)
*H04W 40/00* (2009.01)
(Continued)

(52) U.S. Cl.
CPC ....... *H04W 72/1231* (2013.01); *H04L 1/0027* (2013.01); *H04L 5/0085* (2013.01);
(Continued)

(58) Field of Classification Search
CPC ..... H04W 72/1231; H04W 72/044622; H04W 72/1247; H04L 1/0027; H04L 25/0202;
(Continued)

(56) References Cited

U.S. PATENT DOCUMENTS 8,229,443 B2 * 7/2012 Caire .................... H04W 16/28
455/446
8,804,590 B2 * 8/2014 Nakae .................. H04W 48/12
370/311
(Continued)

FOREIGN PATENT DOCUMENTS

CN    101888667 A    11/2010
CN    101959279 A    1/2011
(Continued)

OTHER PUBLICATIONS

Andreas Muller et al.; "Improving HSDPA Link Adaptation by Considering the Age of Channel Quality Feedback Information"; 2005 IEEE 62nd Vehicular Technology Conference; Dallas, Texas, USA; Sep. 28, 2005; 5 pages.
(Continued)

*Primary Examiner* — Edan Orgad
*Assistant Examiner* — Vanneilian Lalchinthang
(74) *Attorney, Agent, or Firm* — Leydig, Voit & Mayer, Ltd.

(57) ABSTRACT

The present disclosure relates to a network node having a processor and a transceiver. The processor is configured to select at least one user device if a Channel Estimation Timer (CET) for a radio channel between the network node and the at least one user device is valid, and to schedule data transmission to the at least one selected user device. The transceiver is configured to perform the scheduled data transmission to the at least one selected user device. The present disclosure also describes a corresponding method, a wireless communication system including such a network node, a computer program, and a computer program product.

9 Claims, 6 Drawing Sheets

(51) Int. Cl.
*H04L 25/02* (2006.01)
*H04L 5/00* (2006.01)
*H04L 1/00* (2006.01)
*H04W 72/04* (2009.01)

(52) U.S. Cl.
CPC .......... *H04L 5/0087* (2013.01); *H04L 5/0094* (2013.01); *H04L 25/0202* (2013.01); *H04L 25/0204* (2013.01); *H04L 25/0224* (2013.01); *H04W 72/0446* (2013.01)

(58) Field of Classification Search
CPC ............. H04L 25/0204; H04L 25/0224; H04L 5/0085; H04L 5/0087; H04L 5/0094
USPC .......................................................... 370/336
See application file for complete search history.

(56) References Cited

U.S. PATENT DOCUMENTS

| | | | |
|---|---|---|---|
| 2009/0316636 A1* | 12/2009 | Medapalli | H04L 1/002 370/329 |
| 2012/0307702 A1 | 12/2012 | Nakae et al. | |
| 2013/0188567 A1* | 7/2013 | Wang | H04L 5/0094 370/329 |
| 2014/0112284 A1* | 4/2014 | Mansour | H04L 1/0027 370/329 |
| 2016/0037379 A1* | 2/2016 | Shafiee | H04W 28/0268 370/230.1 |
| 2016/0173306 A1* | 6/2016 | Hong | H04L 25/022 370/329 |
| 2017/0163452 A1* | 6/2017 | Breiling | H04L 25/03159 |

FOREIGN PATENT DOCUMENTS

| | | | | |
|---|---|---|---|---|
| CN | 102763452 A | 10/2012 | | |
| WO | 2011142698 A1 | 11/2011 | | |
| WO | WO-2011142698 A1 * | 11/2011 | ........ | H04W 72/1247 |
| WO | 2012033877 A1 | 3/2012 | | |
| WO | 2012173535 A1 | 12/2012 | | |

OTHER PUBLICATIONS

Taesang Yoo et al.; "On the Optimality of Multiantenna Broadcast Scheduling Using Zero-Forcing Beamforming"; IEEE Journal on Selected Areas in Communicaitons; vol. 24, No. 3; Mar. 2006; 14 pages.

* cited by examiner

NETWORK NODE AND METHOD THEREOF

CROSS-REFERENCE TO RELATED APPLICATIONS

This application is a continuation of International Application No. PCT/EP2015/056527, filed on Mar. 26, 2015, the disclosure of which is hereby incorporated by reference in its entirety.

TECHNICAL FIELD

The present application relates to a network node, a corresponding method, a wireless communication system comprising such a network node, a computer program, and a computer program product.

BACKGROUND

Channel estimation is a key function of most wireless communication systems. It is advantageous to make the channel estimation from Uplink (UL) transmissions also for Downlink (DL) beamforming purposes in some wireless communication systems. The reason is that the network nodes of the radio access network have more antennas than the user devices and by using assumption of channel reciprocity feedback messaging can be avoided. Estimating the channel from UL beacon transmissions therefore allow the channels for multiple receive antennas to be estimated from the same transmissions. Further, with increasing number of antennas at the network node it is possible to schedule more user devices simultaneously, at the cost of increasing use of the spectral resources for channel estimation.

However, the channel estimations are only valid as long as the physical environment remains stationary, or during the coherence time of the radio channel. This depends on the speed with which the user device and scatters in its surrounding are moving. Since the channel estimations consume spectral resources it is preferable to reduce the number of channel estimation transmissions to the minimum required for each user device.

Beamforming in spatial domain Multiple Input Multiple Output (MIMO) techniques requires up-to-date Channel State Information (CSI) to work properly in mobile environment. If CSI gets outdated beamforming transmissions add extra interference to the wireless communication system. Additionally, due to Modulation and Coding Scheme (MCS) selection made with out-dated CSI, the error rate will be increased. The Outer-Loop Link Adaptation (OLLA) for MCS selection does not work due to changes in the beamforming on short time scales. If dynamic scheduling is enabled the interference experienced by a single user device is different at each Transmission Time Interval (TTI).

Network nodes, such as base stations, usually support 2-3 sectors in cellular systems and the sectors are interfering with each other at the border areas. Multi-User Multiple Input Multiple Output (MU-MIMO), Coordinate Multi-Point (CoMP) and other variants of spatial domain MIMO techniques have been specified for 3GPP specifications. These new beamforming MIMO techniques will require more up-to-date CSI compared to older sectored cells. Current mechanisms for obtaining the CSI, such as those in Long Term Evolution (LTE), have not been designed for this purpose.

SUMMARY

An objective of embodiments of the present disclosure is to provide a solution which mitigates or solves the drawbacks and problems of conventional solutions.

An "or" in this description and the corresponding claims is to be understood as a mathematical OR which covers "and" and "or", and is not to be understand as an XOR (exclusive OR).

The above and further objectives are solved by the subject matter of the independent claims. Further advantageous implementation forms of the present disclosure can be found in the dependent claims.

According to a first aspect of the disclosure, the above mentioned and other objectives are achieved with a network node for a wireless communication system, the network node comprising:
a processor, and
a transceiver;
wherein the processor is configured to select at least one user device if a Channel Estimation Timer (CET) for a radio channel between the network node and the at least one user device, is valid;
wherein the processor further is configured to schedule data transmission to the at least one selected user device;
wherein the transceiver is configured to perform the scheduled data transmission to the at least one selected user device.

The network node may be a base station, an access point or a central control node such as a radio network controller. However, the network node is not limited to the mentioned communication devices and other examples of such network nodes are given in the following detailed description.

The expression "at least one user device" means that one or more user devices are selected, and the selected user devices have associated CETs that are valid. The CET may be individual for each user device or for a group of user devices.

The transceiver of the network node performs the scheduled data transmission by transmitting data packets according to suitable wireless communication standards, such as those defined by 3GPP.

A number of advantages are provided by the network node according to the first aspect.

By scheduling data to selected user devices fulfilling the condition that the CET is valid improved performance is provided in the wireless communication system. The channel estimations for the selected user devices are updated which result in the improved data transmission performance. This also implies that the spectral resources of the wireless communication system are used more efficiently.

In a first possible implementation form of a network node according to the first aspect, the CET is valid if a timer value of the CET has not expired.

With the first possible implementation form, by not scheduling data transmissions to user devices which has CET that is not valid the use of outdated channel estimations is reduced. This in turn increases probability of successful data transmissions and overall performance.

In a second possible implementation form of a network node according to the first possible implementation form of the first aspect,
the transceiver further is configured to receive a channel estimation beacon indicating a channel estimation for the radio channel;
the processor further is configured to reset the timer value of the CET in response to reception of the channel estimation beacon.

With the second possible implementation form, by receiving channel estimations with beacons instead of CSI reporting or corresponding methods, CSI delays can be minimized. Thus the amount of user devices fulfilling CET validity criteria can be maximized compared to CSI reporting. Additionally, signalling overhead for using reporting channels is reduced.

In a third possible implementation form of a network node according to the second possible implementation form of the first aspect, the processor further is configured to determine a channel estimation beacon transmission rate;

the transceiver further is configured to transmit a first signal S1 to the at least one selected user device, the first signal S1 indicating the channel estimation beacon transmission rate.

With the third possible implementation form, channel estimation beacons can be scheduled to active user devices so that the channel can be measured before data scheduling. The channel estimation beacon transmission rates can also be related to the value of the time value of the CET thereby coordinating the channel estimation beacon transmission rate according to channel aging. Hence, dynamic adaptation to changing channel conditions is possible with this implementation form. Further, channel estimation beacon transmission rate can be related to data scheduling or estimated data packet inter-arrival times in a way such that user devices to be scheduled with data transmissions shall send channel estimation beacon just before the data transmission scheduling.

In a fourth possible implementation form of a network node according to the first, second or third possible implementation forms of the first aspect, the processor further is configured to determine the timer value of the CET based on an error rate for the scheduled data transmission to the at least one selected user device.

With the fourth possible implementation form, by utilizing error rate for determining the timer value of the CET, the timer value can be tuned to meet individual channel coherence times. This is a simple way to determine CET validity and adapt to experienced channel coherence times.

In a fifth possible implementation form of a network node according to the fourth possible implementation form of the first aspect, the timer value is increased if the error rate is below a threshold error rate.

With the fifth possible implementation form, it can be ensured that if the error rate is decreasing, older channel measurements can be tolerated. This increases the number of user devices in the scheduling candidate group. Therefore, more candidates (user devices) can be considered for data scheduling with spatial degrees of freedom. It should also be noted that the opposite case is also possible, i.e., that the timer value is decreased if the error rate is above a threshold or increasing.

In a sixth possible implementation form of a network node according to the fourth or fifth possible implementation forms of the first aspect, the transceiver further is configured to receive a second signal S2 from the at least one selected user device, the second signal S2 indicating the error rate.

With the sixth possible implementation form, if the radio access network is not using HARQ feedback, user devices can still report error rates to the network node. The reported error rates are used for adapting the timer value.

In a seventh possible implementation form of a network node according to any of the preceding possible implementation forms of the first aspect, the processor further is configured to use a scheduling metric for scheduling the data transmission to the at least one selected user device, the scheduling metric comprising the data rate for the scheduled data transmission weighted with the CET or a value associated with the CET.

With the seventh possible implementation form, using the present scheduling metric improved data transmissions to user device(s) is possible. For example, in beamforming, best throughput is obtained when the beam is directed to user device precisely according to the radio channel conditions. Thus, when the user device is moving actual achievable data rate dependent on low channel estimation latency is possible with this implementation form.

In an eighth possible implementation form of a network node according to any of the preceding possible implementation forms of the first aspect, the transceiver further is configured to receive a third signal S3 from the at least one selected user device or from another network node, the third signal S3 indicating the CET.

With the eight possible implementation form, when the user device is moving from one cell to another cell or from one scheduling area to another scheduling area, it could be beneficial to transfer user device specific CET to neighbouring network nodes (such as a base station or a scheduler entity). This helps to make handovers more invisible and seamless in the wireless communication system since there is already a tuned CET to be used after the handover by the receiving network node.

In a ninth possible implementation form of a network node according to the eight possible implementation form of the first aspect, the third signal S3 is received from the other network node in connection with a handover for the at least one selected user device from the other network node to the network node.

With the ninth possible implementation form, it is possible to transfer the CET from the other network node to the network node to achieve the above mentioned advantage of the eighth possible implementation form.

In a tenth possible implementation form of a network node according to any of the preceding possible implementation forms of the first aspect, the transceiver further is configured to transmit a fourth signal S4 to another network node in connection with a handover for the at least one selected user device from the network node to the other network node, the fourth signal S4 indicating the CET.

With the tenth possible implementation form, it is possible to transfer the CET from the network node to the other network node to achieve the above mentioned advantage of the eight possible implementation form.

According to a second aspect of the disclosure, the above mentioned and other objectives are achieved with a wireless communication system comprising at least one network node according to any of the possible implementation forms of the first aspect or to the first aspect as such.

According to a third aspect of the disclosure, the above mentioned and other objectives are achieved with method for a wireless communication system, the method comprising:

selecting at least one user device if a Channel Estimation Timer (CET) for a radio channel between the network node and the at least one user device, is valid;

scheduling data transmission to the at least one selected user device;

performing the scheduled data transmission to the at least one selected user device.

In a first possible implementation form of a method according to the third aspect, the CET is valid if a timer value of the CET has not expired.

In a second possible implementation form of a method according to the first possible implementation form of the third aspect, the method further comprises:

receiving a channel estimation beacon indicating a channel estimation for the radio channel;

resetting the timer value of the CET in response to reception of the channel estimation beacon.

In a third possible implementation form of a method according to the second possible implementation form of the third aspect, the method further comprises:

determining a channel estimation beacon transmission rate;

transmitting a first signal S1 to the at least one selected user device, the first signal S1 indicating the channel estimation beacon transmission rate.

In a fourth possible implementation form of a method according to the first, second or third possible implementation forms of the third aspect, the method further comprises:

determining the timer value of the CET based on an error rate for the scheduled data transmission to the at least one selected user device.

In a fifth possible implementation form of a method according to the fourth possible implementation form of the third aspect, the timer value is increased if the error rate is below a threshold error rate.

In a sixth possible implementation form of a method according to the fourth or fifth possible implementation forms of the third aspect, the method further comprises:

receiving a second signal S2 from the at least one selected user device, the second signal S1 indicating the error rate.

In a seventh possible implementation form of a method according to any of the preceding possible implementation forms of the third aspect, the method further comprises:

using a scheduling metric for scheduling the data transmission to the at least one selected user device, the scheduling metric comprising the data rate for the scheduled data transmission weighted with the CET or a value associated with the CET.

In an eight possible implementation form of a method according to any of the preceding possible implementation forms of the third aspect, the method further comprises:

receiving a third signal S3 from the at least one selected user device or from another network node, the third signal 3 indicating the CET.

In a ninth possible implementation form of a method according to the eight possible implementation form of the third aspect, the third signal S3 is received from the other network node in connection with a handover for the at least one selected user device from the other network node to the network node.

In a tenth possible implementation form of a method according to any of the preceding possible implementation forms of the third aspect, the method further comprises:

transmitting a fourth signal S4 to another network node in connection with a handover for the at least one selected user device from the network node to the other network node, the fourth signal S4 indicating the CET.

The advantages of the methods according to the third aspect are the same as those for the corresponding network node according to the first aspect.

The present disclosure also relates to a computer program with a program code, which when run by a processor causes said processor to execute any method according to the present disclosure. Further, the disclosure also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of the present disclosure will be apparent from the following detailed description.

BRIEF DESCRIPTION OF THE DRAWINGS

The appended drawings are intended to clarify and explain different embodiments of the present disclosure, in which.

DETAILED DESCRIPTION

Figure 1:
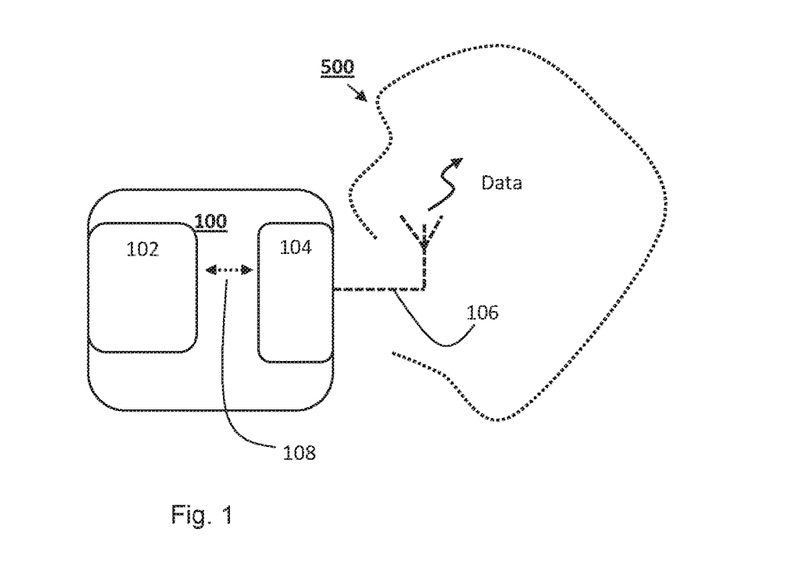
FIG. 1 shows a network node according to an embodiment of the present disclosure.

FIG. 1 shows a network node 100 according to an embodiment of the present disclosure. The network node 100 may also be denoted radio network node and being part of a radio access network of a wireless communication system 500. A network node or also called base station, e.g., a Radio Base Station (RBS), may in some radio access networks be referred to as transmitter, "eNB", "eNodeB", "NodeB" or "B node", depending on the technology and terminology used. The radio network nodes may be of different classes such as e.g., macro eNodeB, home eNodeB or pico base station, based on transmission power and thereby also cell size. The radio network node can be a station (STA), which is any device that contains an IEEE 802.11-conformant media access control (MAC) and physical layer (PHY) interface to the wireless medium (WM).

The network node 100 in FIG. 1 includes a processor 102 communicably coupled, with suitable communication means 108 known in the art, to a transceiver 104. The communication means 108 are illustrated with the dashed arrow in FIG. 1. The transceiver 104 of the network node 100 is configured to receive and transmit communication signals internally within the network node 100 and externally according to wireless and/or wired communication protocols and/or standards with other communication entities in the wireless communication system 500. The network device 100 in FIG. 1 also comprises an optional antenna unit 106 configured to receive and transmit wireless communication signals in the wireless communication system 500. The antenna unit 106 is communicably coupled to the transceiver 104.

The processor 102 of the network device 100 is configured to select at least one user device if a Channel Estimation Timer (CET) for a radio channel between the network node 100 and user device is valid. The user device may be selected from a set of user devices, wherein the set comprises one or more user devices. However, a single user device can also be considered. The processor 102 is further configured to schedule data transmission to the selected user device. The data transmission is scheduled according to suitable scheduling algorithms which will be more explained in the following description. The transceiver 104 is further configured to perform the scheduled data transmission to the selected user device in the wireless communication system 500. Therefore, the processor 102 may further be configured to forward data to the transceiver 104 for transmission and further be configured to control the transceiver 104 and the antenna unit 106 during such data transmissions to the selected user device.

Figure 2:
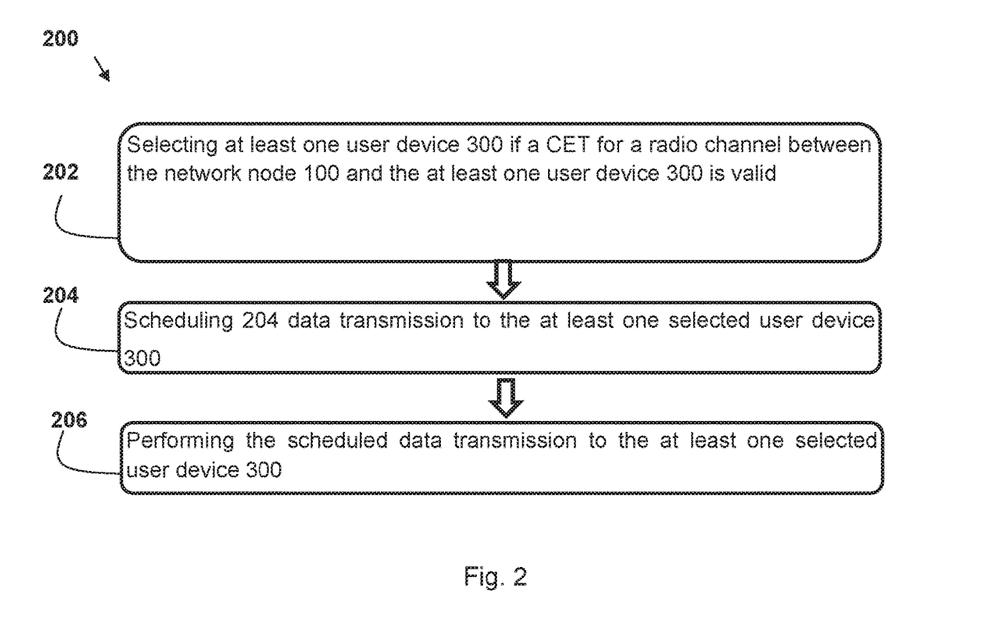
FIG. 2 shows a method according to an embodiment of the present disclosure.

FIG. 2 shows a method 200 according to an embodiment of the present disclosure. The method 200 may be executed in the network node 100 such as the one described in FIG. 1. The method 200 comprises the step of selecting 202 at least one user device 300 if a CET for a radio channel between the network node 100 and the user device 300 is valid. The method 200 further comprises the step of scheduling 204 data transmission to the selected user device 300. The method 200 finally comprises the step of performing 206 the scheduled data transmission to the selected user device 300.

Generally, the CET can be a timer which observes time difference between current time and the time when last channel measurement was made. This time difference observed every TTI could be under certain maximum limit value, which can be tuned according to embodiments of the present disclosure. For example, if the maximum limit value is reached, then the channel measurement is not considered to be valid any more. Alternatively, the CET can have a start value which is tuned according to other embodiments of the present disclosure. The TTI counter value may be decreased every TTI until it expires or the timer is reset. The timer may be reset when a channel measurement is performed, and if the timer has expired then the channel measurement is not considered valid any more.

According to an embodiment of the present disclosure the CET is considered valid if a timer value of the CET has not expired. This means that the timer value can be tuned for adapting to different transmission conditions and requirements in the wireless communication system 500.

According to a further embodiment of the present disclosure the transceiver 104 of the network node 100 is further configured to receive a channel estimation beacon (e.g., CSI beacons) indicating a channel estimation for the radio channel between the network node 100 and the selected user device 300. The received channel estimation beacon is forwarded by the transceiver 104 to the processor 102 which is further configured to reset the timer value of the CET in response to reception of the channel estimation beacon. The channel estimation beacon may be sent directly from the user device 300 to the network node 100. However, the channel estimation beacon may also be transmitted or signalled from the user device 300 to the network node 100 via one or more other network nodes or network control nodes of the wireless communication system 500.

A general idea with this embodiment of the present disclosure is that the most significant part of data transmission to user devices should be performed on the same TTI in which the channel estimation beacons are scheduled. By scheduling more channel estimation beacons for a user device 300 the channel estimates for that specific user device 300 will be kept updated and higher throughput can be achieved for data transmission to that specific user device 300. When data transmission is scheduled, the network node 100 may maximize overall performance by optimizing utilization of spatial domain degrees of freedom with scheduling user device candidates considered as best ones at the moment. Therefore, it may be assumed that all user devices of the wireless communication system 500 should send channel estimation beacon as the radio access network requests. The channel estimation beacon may comprise at least measurable reference signals e.g., similar to LTE's Sounding Reference Signals (SRS).

Hence, embodiments of the present disclosure solve the problem of adjusting the CET for each channel estimation beaconing active user device 300 in the wireless communication system. The timer value shall be used to evaluate whether the channel estimation based on last channel estimation beacon can still be used for scheduling data or not to the user devices. Additionally, the minimum tolerable time between channel estimation beacon transmissions can be obtained for each user device 300.

Therefore, according to a further embodiment of the present disclosure the processor 102 of the network node 100 is further configured to determine a channel estimation beacon transmission rate. Further, the transceiver 104 of the network node 100 is configured to transmit a first signal S1 to the selected user device 300 and the first signal S1 indicates the channel estimation beacon transmission rate. The channel estimation beacons can be scheduled as beacons per time unit, i.e., number of beacons per time unit.

Figure 3:
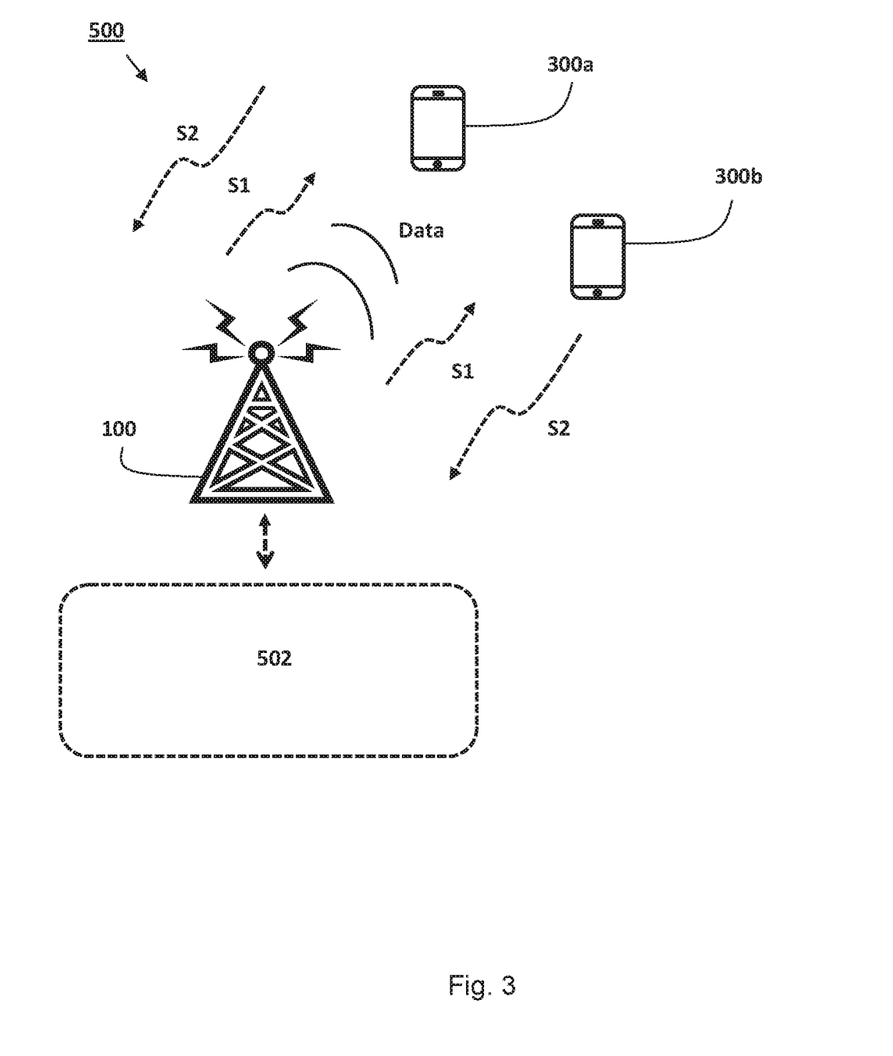
FIG. 3 shows a wireless communication system according to an embodiment of the present disclosure.

This is illustrated in FIG. 3 which shows a wireless communication system 500 according to an embodiment of the present disclosure. The wireless communication system 500 comprises at least one network node 100 which may be part of a radio access network 502 of the wireless communication system 500. It is shown in FIG. 3 that the network node 100 performs data transmission to user devices 300a and 300b, respectively. The network node 100 also transmits first signals S1 to the user devices 300a and 300b for controlling the transmission rate for the channel estimation beacon transmissions from the user devices 300a and 300b to the network node 100. The network node 100 and/or its radio access network 502 can schedule the channel estimation beacon transmissions dynamically or semi-persistently depending on the application. As mentioned, the CSI latency is a significant problem when a MU-MIMO or CoMP system performance should be maximized in a mobile radio access network 502. Hence, it is proposed that the network node 100 and/or the radio access network 502 may schedule channel estimation beacons dynamically as data is desired to be scheduled. Hence, in channel estimation beacon scheduling e.g., some kind of scheduling metric(s) taking buffer status, past average throughput, predicted throughput, data priority, etc. into account could be utilized. Or if user devices are treated equally, for example, a basic Round Robin or Equal Throughput scheduler can be utilized for channel estimation beacon scheduling. Also other methods for channel estimation beacon scheduling can be used.

According to an embodiment of the present disclosure the CET validity should depend on the error rate of each user device 300 to be scheduled for data transmission. In this embodiment the timer value of the CET may be increased if the error rate of the data transmission is below a threshold error rate. This also means that the timer value may be decreased (even to zero value) if the error rate is over a threshold error rate. Examples of suitable error rate measures are Block Error Rate (BLER), Acknowledgement/Negative Acknowledgement (ACK/NACK) is the error rate is defined as numbers of NACKs per number of ACKs, Signal to Interference and Noise Ratio (SINR) and Signal to Noise Ratio (SNR). Error rate information for DL scheduling can be obtained from ACK/NACK HARQ feedback transmissions and/or reported BLER/SINR estimates from the user device 300. For the UL transmissions there is soft often information available. Therefore, in the UL additional feedback is not needed according to an embodiment.

Figure 4:
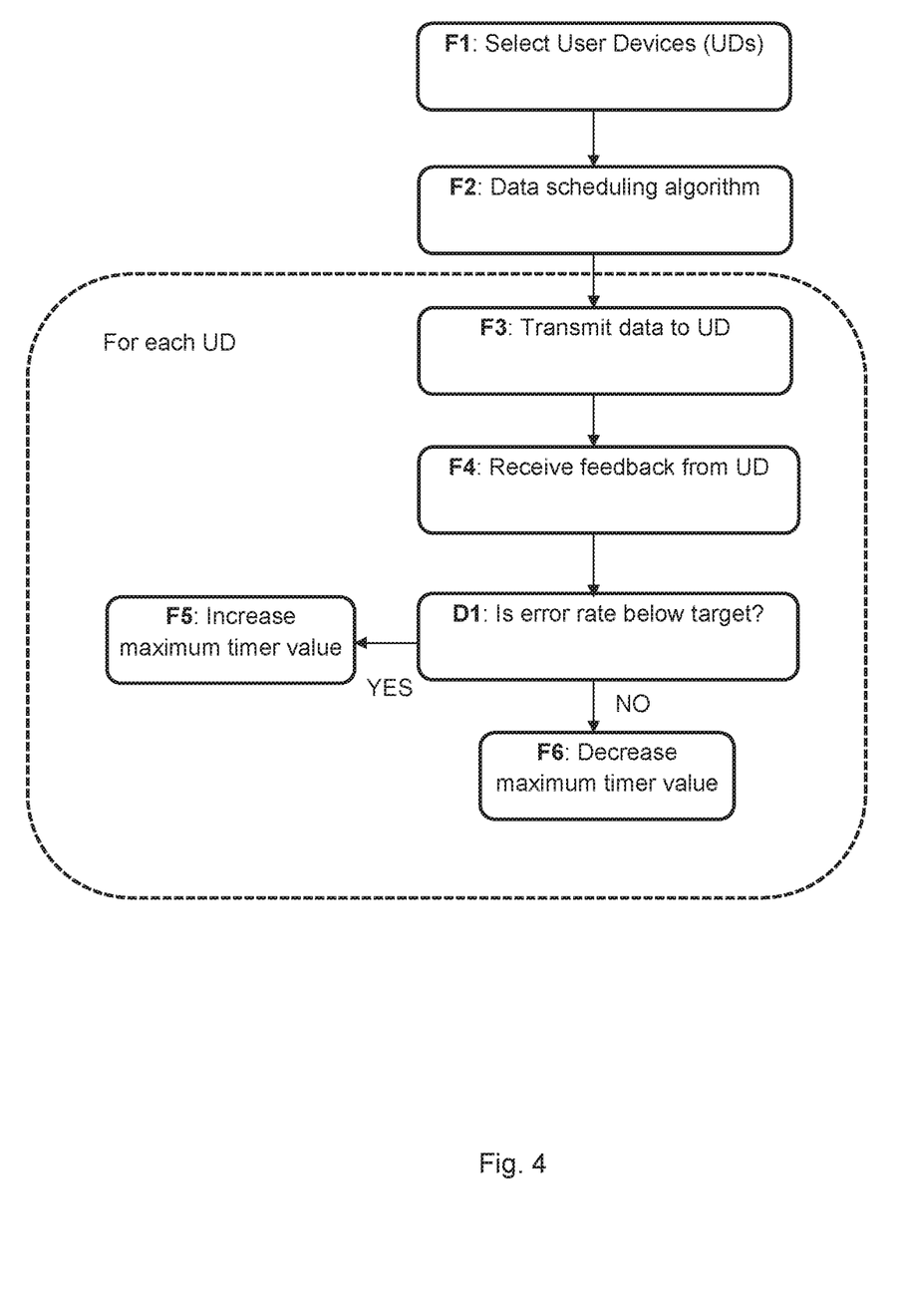
FIG. 4 shows a flow chart of a method according to a further embodiment of the present disclosure.

FIG. 4 shows a method according to a further embodiment of the present disclosure. The method in FIG. 4 may be executed in a network node 100 as described in this disclosure.

In step F1, the User Devices (UDs) are selected among a group of candidate user devices. The selected user devices all have CETs which are valid. Additionally, the network node 100 could control CSI beacon validity with e.g., beacon validity timer. The timer value could be dependent on BLER or BER. The network node 100 can only select user devices whose CSI validity timer has not been expired.

In step F2 data transmissions are scheduled for the selected user devices. Spatial domain (and frequency domain) scheduling can be done based on certain metrics. The scheduling metric m could be, for example, m=SILNR/TSLB, where TSLB is "Time Since Last Beacon" measurement for certain user device 300 and SILNR is "Signal to Interference plus Leakage plus Noise Ratio". Another option could be that expected data rate or throughput is weighted with the TLSB (e.g. rate_weighted=expected_data_rate/TSLB). After that, the weighted data rate can be used in whatever scheduling metric utilizing predicted data rate, e.g., Proportional Fair (PF) or Maximum Throughput (MT) or any other suitable scheduling metric. Therefore, according to an embodiment of the present disclosure the scheduling metric comprises the data rate for the scheduled data transmission weighted with the CET or a value associated with the CET. The value associated with the CET may be derived from the timer of the CET.

Steps F3-F6 and D1 in FIG. 4 are performed for each scheduled user device (UD) 300.

In step F3 the data is transmitted to the selected UD 300. This means that after the scheduling step in F2 data is transmitted to each scheduled UD 300.

In step F4 feedback is received from the scheduled UD 300. The feedback indicates the error rate for the data transmission and may be sent in a second signal S2 from the scheduled UD 300 to the network node 100. After data reception and decoding the scheduled UD 300 will send feedback about the data transmission. Feedback can be a Hybrid Automatic Request (HARQ) ACK/NACK. Additionally, a few bits of information about experienced error rate or SINR could be embedded to HARQ feedback to make feedback even more informative.

In D1, it is determined if the error rate for the data transmission to the scheduled UD 300 is below a target error rate for the data transmission.

If the error rate is below the target error rate the maximum timer value is increased in step F5. If the error rate is over the target error rate the timer value is decreased in step F6. After feedback reception the network node 100 should evaluate whether the experienced BLER or BER is above or below a previously set optimal target value. If BLER or BER is below target, then the CET timer value should be increased. If BLER or BER is above target, then the CET timer value should be decreased. When the channel is measured from the scheduled UD 300, the CET timer value is reset.

In the FIG. 4 BLER CET timer is assumed to be individual for each user device 300, but alternatively a common validity timer value can be tuned based on averaged BLER or BER taking all user devices into account. However, if timers are individual, user devices having different channel conditions and velocities can be served better due to individual adaptation.

Moreover, in some embodiments the TSLB used in the weighting may be relative to the maximum validity timer value of the user device 300. This would allow that user devices with more static channels may have less frequent channel estimation beacons and still get a weighted rate that is comparable to user devices with short channel coherence time.

In FIG. 4 it is assumed that validity timer was handled completely by the network node 100. However, it could be implemented also as a part of a user device modem protocol software. The user device 300 should be able to schedule its own channel estimation beacons or report wanted channel estimation beacon periodicity based on tuned validity timer value. The user device 300 can determine BLER by comparing the amount of successfully decoded packets to the amount of unsuccessfully decoded packets. Then the user device 300 could report this BLER value or some index which relates to wanted channel estimation beacon transmission periodicity to the network node 100.

When actual data transmission is scheduled, the network node 100 could utilize SINR or Signal to Interference plus Leakage plus Noise Ratio (SILNR), or some similar measurement estimation and TSLB into account. The SILNR metric is related to the SLNR metric, with the addition of the interference term coming from the user devices already scheduled. For spatial domain scheduling, a Semi-orthogonal User Scheduling (SUS) principle can be utilized.

In data transmission scheduling it is assumed that resources (e.g., time and frequency) for channel estimation beacons are shared fairly according to some preferred metrics as described in the previous paragraphs. Hence, when spatial domain scheduling is performed, the radio access network 502 should maximize its performance and favour user devices with the most up-to-date channel estimation beacon transmission measured by the radio access network 502.

In the first phase of data scheduling the channel is estimated for all user devices to all available network node antennas. The best user device 300 based on calculated scheduling proposed scheduling metric shall be selected as the first scheduled user device 300. After that, orthogonality or semi-orthogonality for all unscheduled scheduling user device candidates is re-evaluated. Then a second user device 300 can be selected to be scheduled with proposed scheduling metric. After each scheduling decision the radio channels matrices are recalculated so new interference and leakage conditions are taken into account for remaining scheduling user device candidates. When there are no user devices or network nodes which can fulfil scheduling criteria, then final Zero Forcing Beamforming (ZFBF) can be calculated and final SINRs for link adaptation estimated. It should be also noted that after this step there might be some user devices having an estimated SINRs below the minimum threshold and should be still unscheduled. This final step reduces pointless interference generation. Minimum threshold for this final step can be set to a SINR value, which none of the MCSs can support properly since there is a lowest SINR limit over which stable transmission with a MCS is possible.

Figure 5:
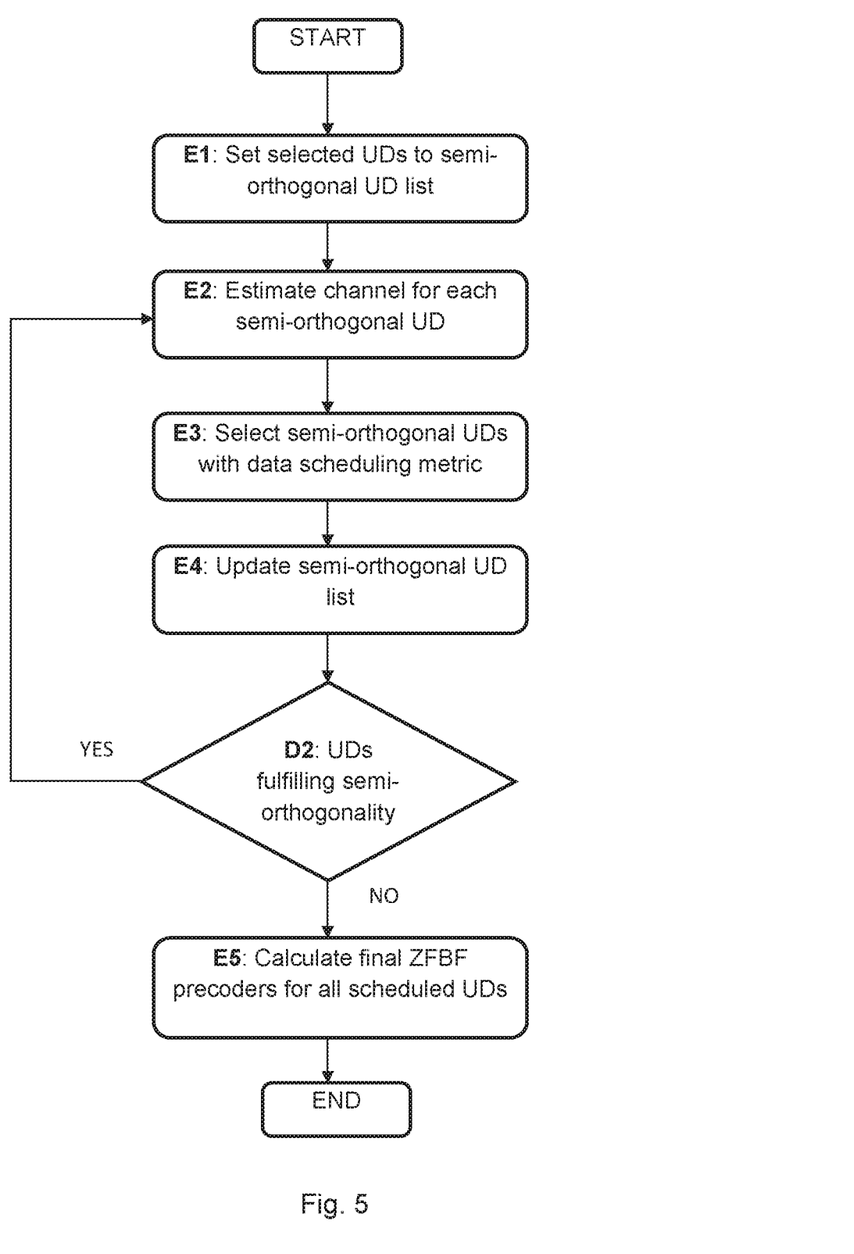
FIG. 5 shows a flow chart of a data scheduling method according to a further embodiment of the present disclosure.

FIG. 5 shows a spatial data scheduling method according to a further embodiment of the present disclosure. The method in FIG. 5 may be executed together with the method in FIG. 4 and the method in FIG. 5 mainly corresponds to the data scheduling step F2 in FIG. 4.

In FIG. 5, the data scheduling is illustrated more in detail. It should be noted that in FIG. 5 it is assumed that the scheduling is performed in CoMP manner for several network nodes of a radio access network 502, but the scheduling algorithm also works for single network node 100 MU-MIMO scheduling. Additionally, the proposed scheduling algorithm can be done individually for each resource block or element or for groups of resource blocks or elements.

In step E1 candidate UDs are set to a Semi-Orthogonal UD List (SOUDL) if the TSLB for the candidate UD 300 is small enough, e.g., smaller than a channel estimation threshold value for the TSLB, i.e., Tmax. Semi-orthogonal means that data transmissions to a user device 300 can be performed without interfering to much with data transmissions to other user devices. The time elapsed from last channel estimation measurement can be calculated as: TSLB=current_time−time_of_last channel estimation_measurement. The channel estimation threshold value or coherence time limit can be determined using UD 300 reported HARQ feedback. Hence, if ACK is received, maximum acceptable delay $T_{max}$ for TSLB can be increased by $T_{up}$, while it is decreased by $T_{down}$ if NACK is received. Hence, the ratio between $T_{up}$ and $T_{down}$ is used to reach wanted $BLER_{target}$ with following equation:

$$T_{up} = \frac{T_{down}}{\frac{1}{BLER_{target}} - 1}. \quad (1)$$

Each UD 300 fulfilling their individual coherence time criteria of $TSLB_n < T_{max,n}$ in the Time Domain (TD) scheduling phase can be selected as a valid scheduling candidate for the present data scheduling phases.

In step E2, the channel is estimated for each UD 300 in the SOUDL for every antenna element of the network node 100. The interference from already scheduled UDs should be taken in account in the channel estimation.

In step E3, unscheduled UDs are selected using a data scheduling metric. The data scheduling metric is based on data rate weighted with the TSLB.

In step E4, the SOUDL is updated by calculating a set of UDs in the SOUDL which still are semi-orthogonal to already scheduled UDs.

In D2, it is determined if there are UDs left in the SOUDL and if there are frequency and time resources left to be scheduled for UDs fulfilling the semi-orthogonality criterion. If YES in decision box D2 the scheduling algorithm returns to step E2. If NO in D2 the scheduling algorithm continues to step E5.

In step E5, the final Zero Force Beamforming (ZFBF) precoders for all scheduled UDs are calculated. Further the MCS for all scheduled and non-scheduled UDs with SINR estimates such that low data rates will not be allowed.

Figure 6:
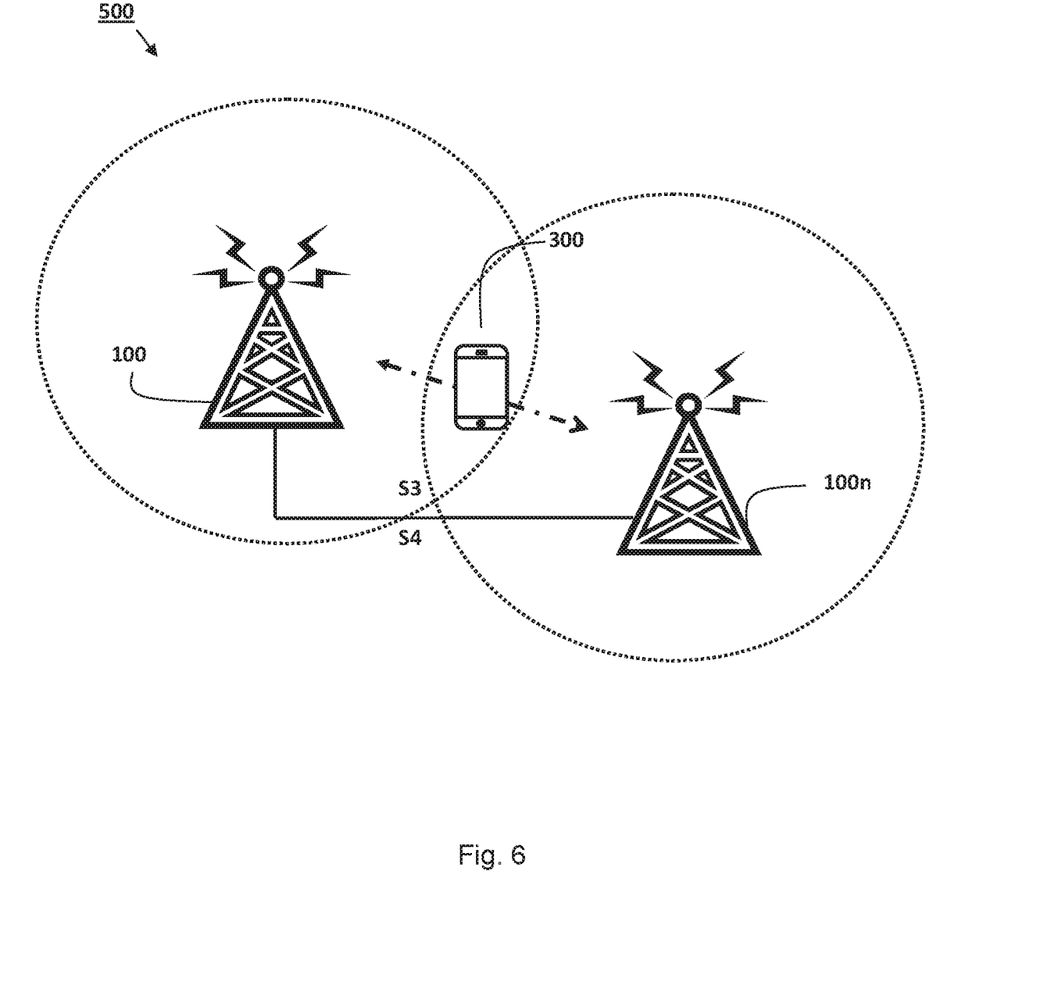
FIG. 6 illustrates handover scenarios in a wireless communication system.

In further embodiments of the present disclosure the CET is transferred between different network nodes in handover scenarios. Hence, the transceiver 104 of the network node 100 further is configured to receive a third signal S3 from the selected user device 300 or from other network node 100n and the third signal S3 indicates the CET. The third signal S3 may therefore be received from other network node 100n in connection with a handover for the selected user device 300. The handover is in this case from other network node 100n to the network node 100. The reverse situation is also possible in which the transceiver 104 of the network node 100 further is configured to transmit a fourth signal S4 to other network node 100n in connection with a handover from the network node 100 to the other network node 100n and the fourth signal S4 indicates the CET. It is also possible to transfer the CET for the user device 300 between different network nodes in other mobility scenarios for the user device 300.

FIG. 6 illustrates the above described embodiments. The user device 300 can move between the serving areas or cells (dotted circles) of network node 100 and 100n, respectively. The movement of the user device between the serving areas or cells is illustrated with the dashed/dotted arrow in FIG. 6. Depending on whether the handover is from or to the network node 100 signals S3 or S4 are transmitted. In the case the handover is from the other network node 100n to network node 100 the third signal S3 is transmitted by the other network node 100n. However, if the handover is from the network node 100 to the other network node 100n the fourth signal S4 is transmitted by the network node 100 to the other network node 100n. In the example in FIG. 6 signals S3 and S4 are transmitted over a wired backhaul network of the radio access network 502. Also wireless transmission between the network nodes 100 and 100n is possible in this respect, for example, by using a wireless backhaul.

Figure 7:
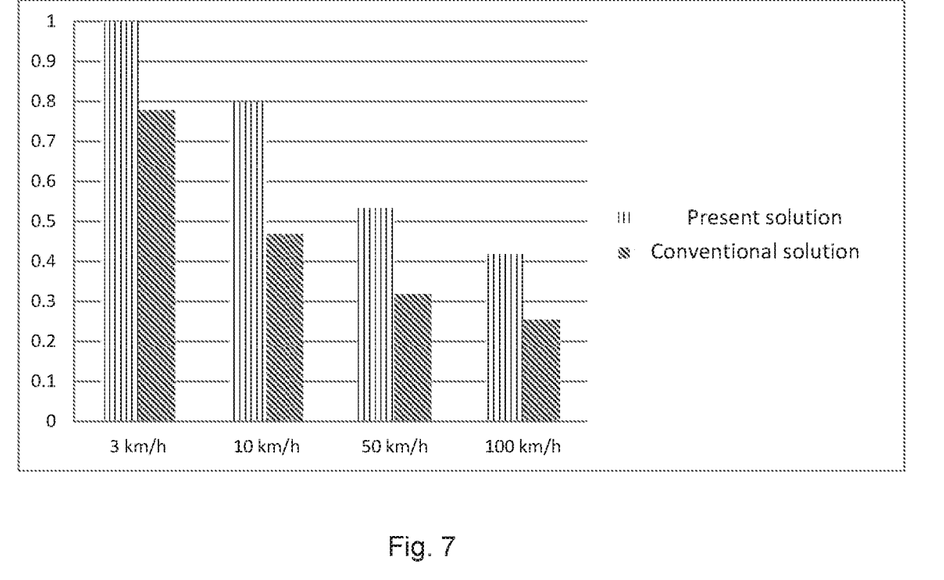
FIG. 7 and FIG. 8 show performance results for embodiments of the present disclosure.
Figure 8:
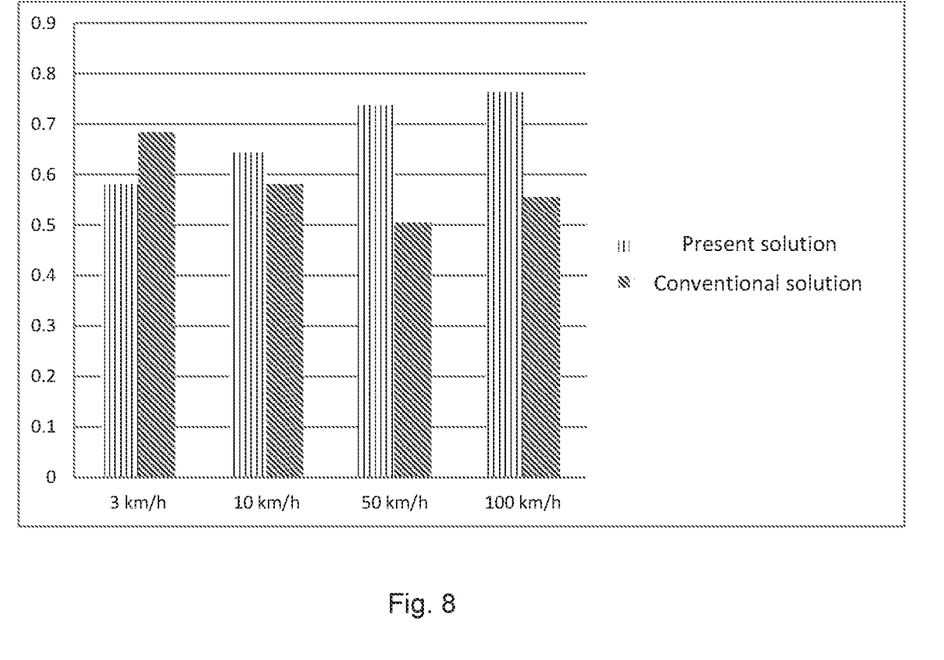

FIGS. 7 and 8 show some performance results of embodiments of the present solution compared to conventional solution. FIG. 7 shows relative area capacity and FIG. 8 shows Jain's Fairness factor.

By performing time domain beacon scheduling randomly by using Round Robin scheduler and maximizing performance by favouring most recent channel measurements while scheduling user devices in spatial/time/frequency domain in data scheduling phase, significant gains can be achieved with the present solution.

When the CET validity timer and proposed CET time based data scheduling approach was evaluated significant performance improvement was achieved when compared to traditional Proportional Fair (PF) scheduling where CSI obtaining is independent from data scheduling. Also, measured scheduling fairness was quite close to each other in low mobility cases. In high mobility cases the proposed scheduling algorithm was even fairer. Simulations results are shown in FIG. 7 and FIG. 8 with 10 access nodes with 4 transmit antennas each. The network nodes were placed in the centre of a 6 lane highway forming 500 m long hotspot area. The car density was assumed such that the cars are 5 m long and with 1 m minimum distance to each other. Safety distance of 2 seconds was assumed between the cars. Hence, car density was dependent of their velocity i.e., in high velocity cases there was less scheduling candidates available for beamforming.

In FIG. 7 relative area throughput is shown for different mobility case, velocities 3, 10, 50 and 100 km/h, and MU-MIMO was used (left blocks—present solution; right blocks conventional solution). It can be seen that coherence time adaptation gives performance gain with Proportional Fair (PF) user device selection for every user device velocity test case, when compared to PF user selection without coherence time adaptation.

FIG. 8 shows scheduling fairness measured with Jain's fairness index for different mobility case, velocities 3, 10, 50 and 100 km/h (left blocks—present solution; right blocks conventional solution). As shown in FIG. 8 the scheduling fairness can be maintained and even improved in higher velocity test cases with embodiments of the present disclosure.

A user device 300, such as User Equipment (UE) in LTE, mobile station, wireless terminal and/or mobile terminal, is enabled to communicate wirelessly in a wireless communication system, sometimes also referred to as a cellular radio system. The user device may further be referred to as mobile telephones, cellular telephones, computer tablets or laptops with wireless capability. The user device 300 in the present context may be, for example, portable, pocket-storable, hand-held, computer-comprised, or vehicle-mounted mobile devices, enabled to communicate voice and/or data, via the radio access network, with another entity, such as another receiver or a server. The user device 300 can be a station (STA), which is any device that contains an IEEE 802.11-conformant media access control (MAC) and physical layer (PHY) interface to the wireless medium (WM).

Furthermore, any method according to the present disclosure may be implemented in a computer program with a program code, which when run by a processor causes the processor to execute the steps of the method. The computer program is included in a computer readable medium of a computer program product. The computer readable medium may comprises of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that the network node 100 comprises the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

Especially, the processors of the present devices may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the present disclosure is not limited to the embodiments described above, but also relates to and incorporates all embodiments within the scope of the appended independent claims.

The invention claimed is:

1. A network node for a wireless communication system, the network node comprising:
   a processor; and
   a transceiver,
   wherein the processor is configured to:
      select at least one user device if a Channel Estimation Timer (CET) for a radio channel between the network node and the at least one user device is valid, wherein the CET is valid if a timer value of the CET has not expired, and
      schedule data transmission to the at least one selected user device; and
   wherein the transceiver configured to perform the scheduled data transmission to the at least one selected user device;
   wherein the transceiver is further configured to receive a channel estimation beacon for indicating a channel estimation for the radio channel;
   wherein the processor is further configured to:
      reset the timer value of the CET in response to the transceiver receiving the channel estimation beacon, and
      determine a channel estimation beacon transmission rate;
   wherein the transceiver is further configured to transmit a first signal S1 to the at least one selected user device, the first signal S1 for indicating the channel estimation beacon transmission rate; and
   wherein the transceiver is further configured to receive a third signal S3 from the at least one selected user device or from another network node, the third signal S3 for indicating the CET.

2. The network node according to claim 1, wherein the processor is further configured to determine the timer value of the CET based on an error rate for the scheduled data transmission to the at least one selected user device.

3. The network node according to claim 2, wherein the timer value is increased if the error rate is below a threshold error rate.

4. The network node according to claim 2, wherein the transceiver is further configured to receive a second signal S2 from the at least one selected user device, the second signal S2 for indicating the error rate.

5. The network node according to claim 1, wherein the processor is further configured to use a scheduling metric for scheduling the data transmission to the at least one selected user device, wherein the scheduling metric comprises a data rate for the scheduled data transmission weighted with the CET or a value associated with the CET.

6. The network node according to claim 1, wherein the third signal S3 is received from the another network node in connection with a handover for the at least one selected user device from the another network node to the network node.

7. The network node according to claim 1, wherein the transceiver further is configured to transmit a fourth signal S4 to another network node in connection with a handover for the at least one selected user device from the network node to the another network node, the fourth signal S4 for indicating the CET.

8. A wireless communication system comprising:
   at least one network node comprising:
      a processor configured to:
         select at least one user device if a Channel Estimation Timer (CET) for a radio channel between the network node and the at least one user device is valid, wherein the CET is valid if a timer value of the CET has not expired, and
         schedule data transmission to the at least one selected user device; and
      a transceiver configured to:
         perform the scheduled data transmission to the at least one selected user device, and
         receive a channel estimation beacon for indicating a channel estimation for the radio channel;

wherein the processor is further configured to:
reset the timer value of the CET in response to the transceiver receiving the channel estimation beacon, and
determine a channel estimation beacon transmission rate;
wherein the transceiver is further configured to transmit a first signal S1 to the at least one selected user device, the first signal S1 for indicating the channel estimation beacon transmission rate; and
wherein the transceiver is further configured to receive a third signal S3 from the at least one selected user device or from another network node, the third signal S3 for indicating the CET.

9. A method for a wireless communication system, the method comprising:
receiving a channel estimation beacon for indicating a channel estimation for a radio channel;
resetting a timer value of a Channel Estimation Timer (CET) in response to receiving the channel estimation beacon;
determining a channel estimation beacon transmission rate;
selecting at least one user device if the CET for the radio channel between a network node and the at least one user device is valid, wherein the CET is valid if a timer value of the CET has not expired;
transmitting a first signal S1 to at least one selected user device, the first signal S1 for indicating the channel estimation beacon transmission rate;
receiving a third signal S3 from the at least one selected user device or from another network node, the third signal S3 for indicating the CET;
scheduling data transmission to the at least one selected user device; and
performing the scheduled data transmission to the at least one selected user device.

* * * * *